(12) United States Patent
Oshima et al.

(10) Patent No.: US 12,333,409 B2
(45) Date of Patent: Jun. 17, 2025

(54) INFORMATION PROCESSING DEVICE AND LEARNING RECOGNITION SYSTEM

(71) Applicant: Hitachi, Ltd., Tokyo (JP)

(72) Inventors: Takashi Oshima, Tokyo (JP); Goichi Ono, Tokyo (JP); Tadashi Kishimoto, Tokyo (JP); Masaru Kokubo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 902 days.

(21) Appl. No.: 17/513,968

(22) Filed: Oct. 29, 2021

(65) Prior Publication Data

US 2022/0222506 A1 Jul. 14, 2022

(30) Foreign Application Priority Data

Jan. 13, 2021 (JP) .................. 2021-003454

(51) Int. Cl.
 *G06N 3/045* (2023.01)
 *G06V 10/82* (2022.01)
(52) U.S. Cl.
 CPC ............. *G06N 3/045* (2023.01); *G06V 10/82* (2022.01)
(58) Field of Classification Search
 CPC ......... G06N 3/045; G06N 3/084; G06V 10/82
 See application file for complete search history.

(56) References Cited

U.S. PATENT DOCUMENTS

| | | | |
|---|---|---|---|
| 2021/0142177 A1* | 5/2021 | Mallya | G06N 3/084 |
| 2021/0150275 A1* | 5/2021 | Schulter | G06V 20/58 |
| 2021/0192341 A1 | 6/2021 | Oya et al. | |
| 2021/0201078 A1* | 7/2021 | Yao | G06N 3/08 |

FOREIGN PATENT DOCUMENTS

| | | |
|---|---|---|
| JP | 8-212184 A | 8/1996 |
| JP | 2018-193201 A | 12/2018 |
| JP | 2019-191899 A | 10/2019 |
| JP | 2020-154798 A | 9/2020 |
| WO | 2020/188436 A1 | 9/2020 |

OTHER PUBLICATIONS

Japanese Office Action received in corresponding Japanese Application No. 2021-003454 dated Feb. 6, 2024.
Park, G. et al., "Convolutional Neural Network with Developmental Memory for Continual Learning", IRRR Transactions on Neural Networks and Learning Systems, Jun. 2021, pp. 2691-2705, vol. 32, No. 6.

* cited by examiner

*Primary Examiner* — Fayyaz Alam
(74) *Attorney, Agent, or Firm* — MATTINGLY & MALUR, PC

(57) ABSTRACT

An information processing device includes a parallel deep neural network configured to input a captured image of an article to deep neural network models respectively corresponding to a plurality of articles and perform inferences about the plurality of articles in parallel using the deep neural network models, a new article determination unit configured to determine whether an article included in the image is an unlearned article based on learned model information about the articles and the image, and a new article learning unit configured to learn a deep neural network model corresponding to the article determined to be unlearned based on the image and initial model configuration information about the deep neural network model when the article included in the image is determined to be an unlearned article. The new article learning unit adds the learned deep neural network model to the deep neural network models.

8 Claims, 16 Drawing Sheets

FIG. 14

CONTENT IN SHAPE PRIORITY STORAGE UNIT

| RANKING | FIRST PERIOD | SECOND PERIOD | THIRD PERIOD |
|---|---|---|---|
| 1 | BOX | BOTTLE | CUP |
| 2 | BOTTLE | BOX | BOTTLE |
| 3 | CUP | CUP | BOX |
| 4 | CAN | CAN | CAN |

| IMAGE | | IMAGE | | IMAGE | |
|---|---|---|---|---|---|
| ARTICLE 1? | ARTICLE 3? | ARTICLE 3? | ARTICLE 1? | ARTICLE 5? | ARTICLE 5? |
| ARTICLE 2? | ARTICLE 4? | ARTICLE 4? | ARTICLE 2? | ARTICLE 6? | ARTICLE 6? |
| BOX | BOTTLE HIT | BOTTLE | BOX | CUP HIT | CUP HIT |

INFORMATION PROCESSING DEVICE AND LEARNING RECOGNITION SYSTEM

CROSS-REFERENCE TO RELATED APPLICATION

The present application claims priority from Japanese application JP 2021-003454, filed on Jan. 13, 2021, the contents of which is hereby incorporated by reference into this application.

BACKGROUND OF THE INVENTION

1. Field of the Invention

The present invention relates to deep learning.

2. Description of the Related Art

Decrease of working population and skilled workers is in progress, and in logistics and production fields, there is an increasing need for full automation using artificial intelligence (AI) and robots. In these fields, the AI is required to recognize an article from an image captured by a camera. For example, it is necessary to capture an image of an article flowing on a belt conveyor, detect a type and position information of the article from the image, operate a robot arm to grasp and sort the article based on a detection result, and the like.

In recent years, the deep learning is developed as AI for image recognition. The deep learning can perform classification and position information detection on a plurality of classes (that is, a plurality of types) of articles by calculation using a deep neural network.

The deep neural network needs to learn parameter groups (a weighting coefficient and the like) required for construction thereof in advance. For example, JP-A-2019-191899 discloses a learning method.

In general, the deep learning takes a long time due to a huge amount of calculation. In the related art, an approach is taken in which all articles that can appear in a system are assumed in advance, and a multi-class deep neural network covering all varieties of the articles is learned in advance and used for inference (AI execution).

However, in the logistics and production fields, in recent years, new articles that have never existed are often added to the system. In the approach in the related art, every time a new article appears, the deep neural network needs to be relearned for all the articles in a form that covers the new article and existing articles, and therefore a long learning time is required each time. Therefore, in the technique described in JP-A-2019-191899, it is difficult to evolve the system (that is, add a new article) without impairing actual operation.

SUMMARY OF THE INVENTION

An object of the invention is to provide an information processing device capable of adding a new article to a system without impairing actual operation, and a learning recognition system.

An information processing device according to the invention is configured as an information processing device including a parallel deep neural network configured to input a captured image of an article to deep neural network models respectively corresponding to a plurality of articles and perform inferences about the plurality of articles in parallel using the deep neural network models, a new article determination unit configured to determine whether an article included in the image is an unlearned article based on learned model information about the articles and the image, and a new article learning unit configured to learn a deep neural network model corresponding to the article determined to be unlearned based on the image and initial model configuration information about the deep neural network model when the article included in the image is determined to be an unlearned article, in which the new article learning unit adds the learned deep neural network model to the deep neural network models.

According to the invention, a new article can be added to a system without impairing actual operation. Objects, configurations, and effects other than those described above will be clarified by the following description of embodiments for carrying out the invention.

BRIEF DESCRIPTION OF THE DRAWINGS

FIG. 14 is a diagram showing a time chart of the fourth embodiment.

DESCRIPTION OF THE PREFERRED EMBODIMENTS

Figure 1:
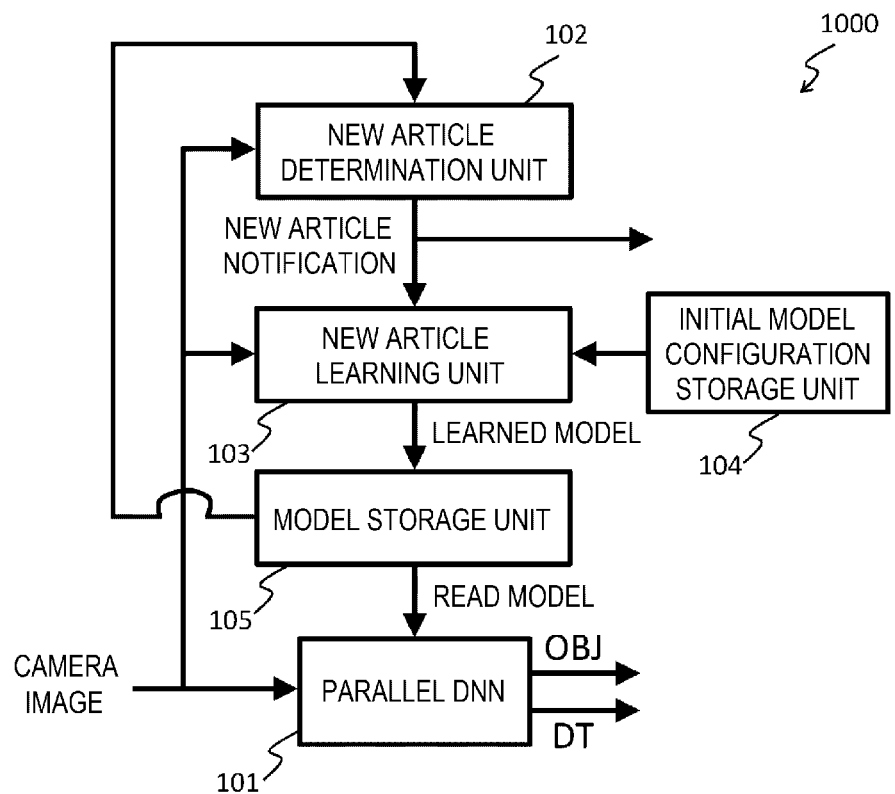
FIG. 1 is a diagram showing an arithmetic unit that performs learning and recognition of a first embodiment.

Hereinafter, embodiments of the invention will be described with reference to the drawings. The following description and drawings are examples for describing the invention, and are omitted and simplified as appropriate for clarification of the description. The invention can be implemented in various other forms. Unless otherwise limited, each component may be singular or plural.

In order to facilitate understanding of the invention, a position, a size, a shape, a range, or the like of each component shown in the drawings may not represent an actual position, size, shape, range, or the like. Therefore, the invention is not necessarily limited to the position, size, shape, range, or the like shown in the drawings.

In the following description, although various types of information may be described in terms of expressions such as "table" and "list", the various types of information may be expressed by other data structures. "XX table", "XX list", and the like may be referred to as "XX information" to indicate that information does not depend on a data structure. When identification information is described using expressions such as "identification information", "identifier", "name", "ID", and "number", the expressions can be replaced with each other.

When there are a plurality of components having the same or similar function, different subscripts may be attached to the same reference sign. When there is no need to distinguish the plurality of components, the subscripts may be omitted.

In the following description, a processing performed by executing a program may be described. The program is executed by a processor (for example, a central processing unit (CPU) or a graphics processing unit (GPU)) to appropriately perform a predetermined processing using a storage resource (for example, a memory) and/or an interface device (for example, a communication port), or the like. Therefore, the processor may serve as a subject of the processing. Similarly, the subject of the processing performed by executing the program may be a controller, a device, a system, a computer, or a node including the processor. The subject of the processing performed by executing the program may be a calculation unit, and may include a dedicated circuit (for example, a field-programmable gate array (FPGA) or an application specific integrated circuit (ASIC)) for performing a specific processing.

The program may be installed from a program source into a device such as a computer. The program source may be, for example, a program distribution server or a computer-readable storage medium. When the program source is the program distribution server, the program distribution server may include a processor and a storage resource that stores a program to be distributed, and the processor of the program distribution server may distribute the program to be distributed to another computer. Two or more programs may be implemented as one program, or one program may be implemented as two or more programs in the following description.

Figure 19:
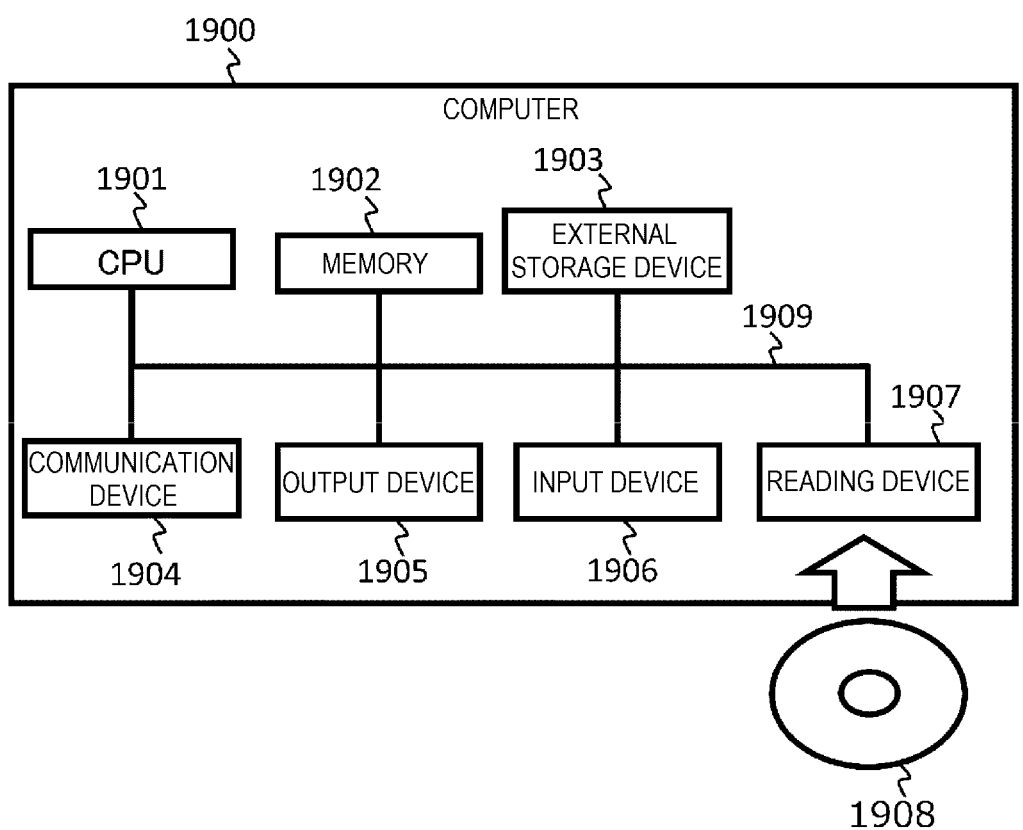
FIG. 19 is a schematic computer diagram of an arithmetic unit or a system.

An arithmetic unit or a system shown in each of the following embodiments can be implemented by, for example, a general computer 1900 as shown in FIG. 19 (schematic computer diagram), the general computer 1900 including a CPU 1901, a memory 1902, an external storage device 1903 such as a hard disk drive (HDD), a reading device 1907 that reads and writes information from and to a portable storage medium 1908 such as a compact disk (CD) or a USB memory, an input device 1906 such as a keyboard and a mouse, an output device 1905 such as a display, a communication device 1904 such as a network interface card (NIC) for connecting to a communication network, and an internal communication line 1909 (called system bus) such as a system bus that connects these components.

Various data stored in the arithmetic unit or the system or used for processing (for example, a DNN model) can be implemented by the CPU 1901 reading from the memory 1902 or the external storage device 1903 and using the data. The memory 1902 or the external storage device 1903 implements, for example, functions of an initial model configuration storage unit, a model storage unit, a feature extraction unit configuration storage unit, and a shape priority storage unit in the embodiments shown below. Each functional unit of each system or arithmetic unit can be implemented by the CPU 1901 loading a predetermined program stored in the external storage device 1903 into the memory 1902 and executing the program. The CPU 1901 executes, for example, a program for implementing a function of a parallel DNN, a new article determination unit, a new article learning unit, a feature extraction unit (including a contracted feature extraction unit, and feature extraction units for each shape), an identification unit, a selection unit, an augmentation unit, an annotation unit, a coefficient updating unit, a comparison unit, a shape detection unit, or a multi-article DNN in the embodiments shown below.

The predetermined program described above may be stored (downloaded) in the external storage device 1903 from the storage medium 1908 via the reading device 1907 or from a network via the communication device 1904, and may then be executed by the CPU 1901 by being loaded into the memory 1902. The program may also be loaded directly into the memory 1902 from the storage medium 1908 via the reading device 1907 or from the network via the communication device 1904 and then executed by the CPU 1901.

In the following, a case where each functional unit is implemented by one computer is exemplified, but these functional units may be implemented by a plurality of computers. Furthermore, all or a part of these functional units may be distributed and provided on one or more computers such as a cloud, and these functional units may implement a same function by communicating with each other via a network.

In the following, for example, in a first embodiment, a deep neural network dedicated to each article is learned, and the learned deep neural network dedicated to each article is used in parallel with each other to perform inferences for a plurality of articles at the same time. Furthermore, for example, in a second embodiment, the feature extraction unit of the deep neural network dedicated to each article is shared with each other. Alternatively, for example, in a third embodiment, the feature extraction unit is shared only for articles belonging to the same shape. By adopting such a configuration, it is possible to implement an arithmetic unit and a system capable of learning a new article in a short time and recognizing the learned article at a high speed. Configurations of the embodiments shown below may be appropriately combined and implemented according to an environment in which the unit or system is used.

First Embodiment

The first embodiment of the invention will be described with reference to FIGS. 1 to 5.

FIG. 1 shows a configuration of an arithmetic unit 1000 that performs learning and recognition according to the present embodiment. An image taken by a camera (hereinafter, referred to as camera image) is input to a parallel deep neural network (hereinafter, referred to as DNN) 101. The parallel DNN 101 performs an inference and outputs a type (OBJ) of an article included in the camera image and a detection result (DT) of the article. The parallel DNN 101 is provided with each DNN model for each previously learned article in parallel, so that a plurality of types of articles can be recognized at once.

At the same time, the camera image is also input to a new article determination unit 102. The new article determination unit 102 determines whether the article included in the camera image is a learned article so far. When the article is determined to be an unlearned article (that is, a new article), the new article determination unit 102 outputs a new article notification signal. The camera image is also input to a new article learning unit 103. Upon receiving the new article notification signal, the new article learning unit 103 learns a DNN model corresponding to the new article included in the camera image based on initial model configuration information stored in an initial model configuration storage unit 104. The DNN model learned by the new article learning unit 103 is sent by the new article learning unit 103 to a model storage unit 105 for storing. Each DNN model including the newly learned DNN model is read into the parallel DNN 101 at an appropriate timing by, for example, the new article learning unit 103. In this way, a new type of article can be recognized.

Figure 2:
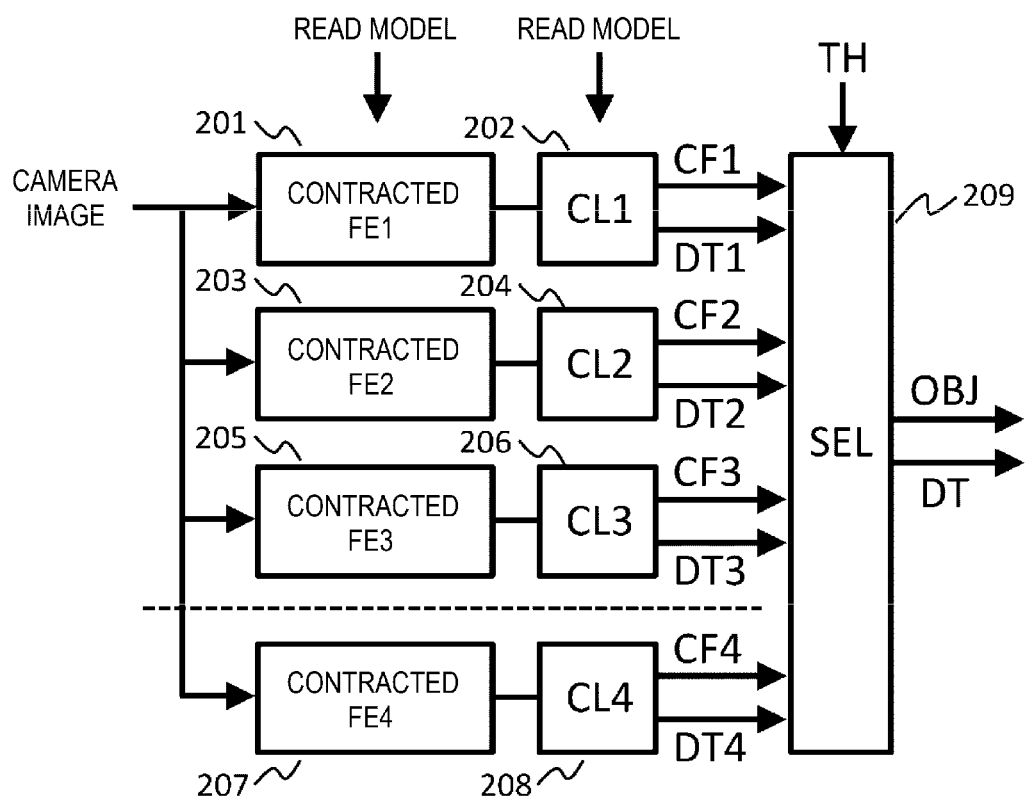
FIG. 2 is a diagram showing a parallel DNN of the first embodiment.

FIG. 2 shows a configuration of the parallel DNN 101. Contracted feature extraction units (hereinafter, referred to as contracted FE) 201, 203, 205, and 207 are provided in parallel. Furthermore, each of the contracted FEs 201, 203, 205, and 207 is followed by an identification unit (hereinafter, referred to as CL) 202, 204, 206, or 208. A DNN model is constituted by a contracted FE and a CL. In FIG. 2, a first contracted FE and a first CL (contracted FE1 and CL1) constitute a DNN model for an article 1, a second contracted FE and a second CL (contracted FE2 and CL2) constitute a DNN model for an article 2, and a third contracted FE and a third CL (contracted FE3 and CL3) constitute a DNN model for an article 3. A fourth contracted FE and a fourth CL (contracted FE4 and CL4) constitute a DNN model for a newly learned new article 4. The number of the DNN models that are provided in parallel in the parallel DNN 101 increases as a new article is encountered. The camera images are input to these parallelized DNN models and the inferences are performed at the same time for each article, including the added article. In FIG. 2, in order to make the arithmetic unit compact in terms of capacity, the parallel DNN 101 is configured by using the contracted feature extraction units, but when compactification is not required, a feature extraction unit that is not contracted may be used. The feature extraction unit extracts, for example, features of an image such as a feature amount and a feature point.

Each CL outputs a confidence value (CF) and a detection result (DT). That is, CL1 outputs CF1 and DT1, CL2 outputs CF2 and DT2, CL3 outputs CF3 and DT3, and CL4 outputs CF4 and DT4. Each confidence value (CF) indicates a probability that the corresponding article is present. The detection result (DT) is, for example, a detection value such as coordinates of a bounding box of the corresponding article, coordinates of a contour of the article, coordinates of a graspable region of the article, and the like.

The confidence value (CF) and the detection result (DT) from each CL are input to a selection unit (SEL) 209. The selection unit (SEL) 209 selects the largest confidence value among the confidence values (CF). For example, the SEL 209 determines that the article 3 is most likely to be present when CF3 is the largest among CF1, CF2, CF3, and CF4. The SEL 209 then determines whether the selected CF3 is greater than or equal to a threshold (TH). When CF3 is greater than or equal to the threshold (TH), the SEL 209 determines that the article 3 exists, and outputs "3" indicating the article 3 as the type (OBJ) of the article. At the same time, the SEL 209 outputs DT3, which is a detection result for the article 3, as a detection result (DT) for the article. When the selected CF3 is less than the threshold (TH), the SEL 209 determines that a known article does not exist, and outputs "0" indicating that the known article does not exist as a type (OBJ) of the article. The above is an example when CF3 is the largest, but the same processing is performed when the confidence value (CF) for other articles is the largest.

Figure 3:
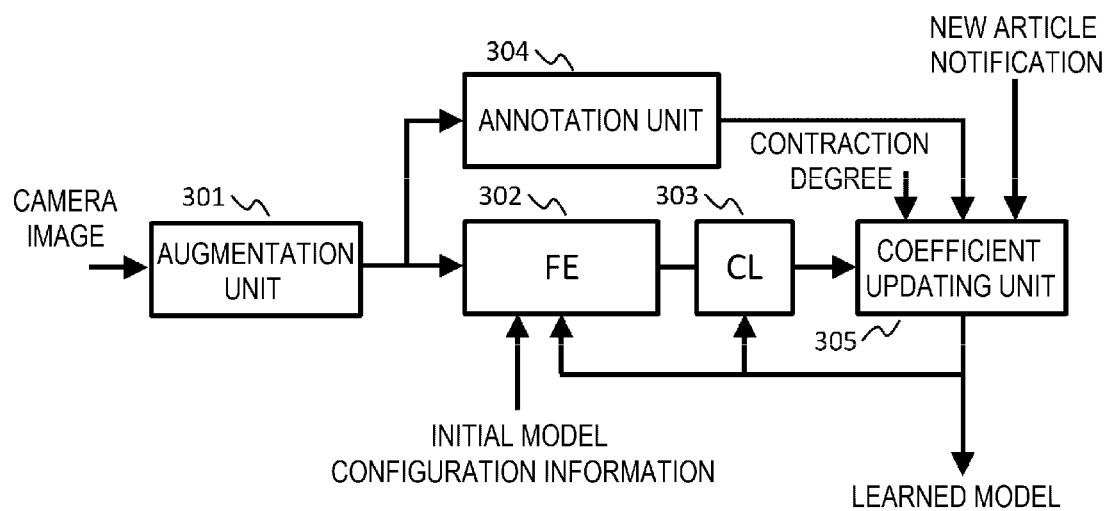
FIG. 3 is a diagram showing a new article learning unit of the first embodiment.

FIG. 3 shows a configuration of the new article learning unit 103. The camera image is input to an augmentation unit 301. The augmentation unit 301 performs a translation operation, a rotation operation, chromaticity adjustment, and the like, or a combination thereof on the camera image to exert an effect of increasing the number of images to an amount required for deep learning.

The image padded by the augmentation unit 301 is input to a feature extraction unit (FE) 302. An output of the feature extraction unit (FE) 302 is input to an identification unit (CL) 303. The feature extraction unit (FE) 302 and the identification unit (CL) 303 constitute a DNN model for one article.

The padded image is also input to an annotation unit 304. The annotation unit 304 annotates (tags) these images for the deep learning. The annotation unit 304 outputs, for example, the coordinates of the bounding box of the article in the image, the coordinates of the contour of the article, the coordinates of the graspable region of the article, and the like, depending on a purpose of learning or inference. These annotations are performed by an existing signal processing technique, deep learning, or a combination thereof.

The output of the identification unit (CL) 303 and the output of the annotation unit 304 are supplied to a coefficient updating unit 305. The new article notification signal and a contraction degree designation signal are also input to the coefficient updating unit 305. Upon receiving the new article notification signal, the coefficient updating unit 305 starts learning the DNN model. When the coefficient updating unit 305 is in learning, the current learning is continued even if the new article notification signal is received.

Before the learning, the initial model configuration information is read into the feature extraction unit (FE) 302. The initial model configuration information gives a default value for a parameter group (a weighting coefficient and the like) that constitutes the DNN model. The initial model configuration information may also be given to the identification unit (CL) 303.

The coefficient updating unit 305 performs learning by sequentially updating parameter groups of the feature extraction unit (FE) 302 and the identification unit (CL) 303 using an existing back propagation technique or the like. In this case, the coefficient updating unit 305 invalidates apart of parameters in the feature extraction unit (FE) 302 (that is, sets a part of parameters in the feature extraction unit (FE) 302 to 0) according to a contraction degree designated by the contraction degree designation signal. The coefficient updating unit 305 validates all parameters when the contraction degree designation signal designates no contraction. There is a trade-off that the higher the contraction degree (that is, the more parameters are set to 0), the more hardware resources (that is, arithmetic resources and memory resources) can be reduced, but a recognition accuracy deteriorates accordingly. In this case, the coefficient updating unit 305 of the new article learning unit 103 may perform the learning without setting a part of the parameters of the deep neural network model corresponding to the article determined to be unlearned. By performing such control, learning according to the contraction degree and the required recognition accuracy becomes possible.

The parameter group obtained by the above learning is supplied to and stored in the model storage unit 105 by the coefficient updating unit 305 as a learned model for the article.

Figure 4:
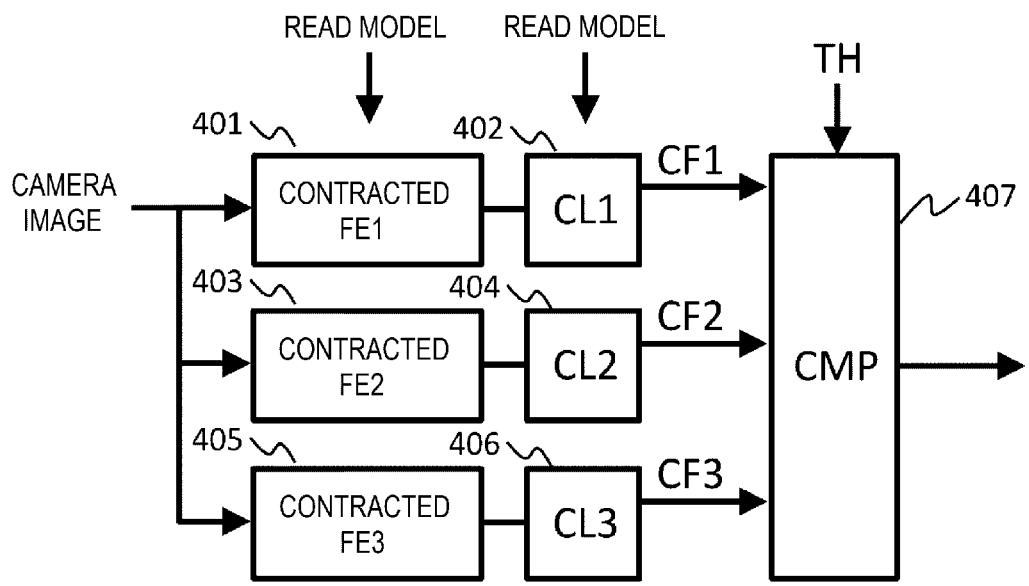
FIG. 4 is a diagram showing a new article determination unit of the first embodiment.

FIG. 4 shows a configuration of the new article determination unit 102. The new article determination unit 102 is provided with the learned DNN models in parallel, and each DNN model includes a contracted feature extraction unit (hereinafter, referred to as contracted FE) and a subsequent identification unit (hereinafter, referred to as CL). Contracted FEs 401, 403, and 405 and CLs 402, 404, and 406 read learned model information (that is, parameter group information) of the article 1, article 2, and article 3 stored in the model storage unit 105 and constitute DNN models for the article 1, article 2, and article 3, respectively. The camera image is input to each feature extraction unit (FE), and inference for each article is performed in parallel (simultaneously) with each other.

Each CL outputs the confidence value (CF). These confidence values (CF) are supplied to a comparison unit (CMP) 407. The threshold value (TH) is also supplied to the comparison unit (CMP) 407. When all the supplied confidence values (CF) are below the threshold value (TH) and it is determined that some article is present in the image, the comparison unit (CMP) 407 determines that the article in the image is a new article (that is, an unlearned article), and outputs the new article notification signal. The determination of whether an article is present in the image is also performed based on each confidence value (CF). Alternatively, although not shown, a signal processing unit that determines whether there is an article from the camera image may be separately provided, and a determination result may be supplied to the comparison unit (CMP) 407. The comparison unit (CMP) 407 can similarly determine presence or absence of the new article and output the new article notification signal.

Figure 5:
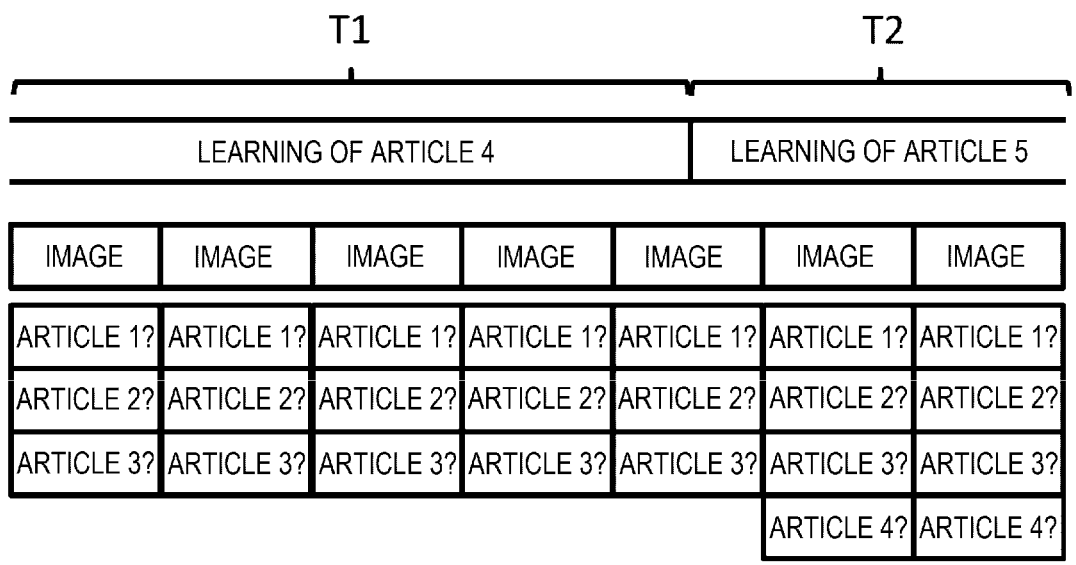
FIG. 5 is a diagram showing a time chart of the first embodiment.

FIG. 5 shows a time chart of the present embodiment. In a period T1 on a left side of the drawing, learning of the article 1, article 2, and article 3 is completed, and the parallel DNN 101 is provided with the DNN models for these three types of articles in parallel and performs inferences. As a result, it is determined whether each image taken by the camera corresponds to any of these three types of articles (that is, the OBJ is obtained), and at the same time, a detection result (DT) such as the coordinates of the bounding box of the article, the coordinates of the contour of the article, and the coordinates of the graspable region of the article can be obtained.

In a period T2 on a right side of the drawing, learning of the new article 4 is completed. Therefore, the parallel DNN 101 is provided with the DNN models for four types of articles including the article 4 in parallel, and performs inferences. As a result, it is determined whether each image taken by the camera corresponds to any of these four types of articles including the added new article 4 (that is, the OBJ is obtained), and at the same time, a detection result (DT) such as the coordinates of the bounding box of the article, the coordinates of the contour of the article, and the coordinates of the graspable region of the article can be obtained.

Each of the above configurations and operations can be implemented by using a dedicated arithmetic unit, memory, CPU, or the like provided in hardware.

Therefore, in the present embodiment, a parallel deep neural network (for example, the parallel DNN 101) that inputs a captured image of an article to a deep neural network model (for example, the DNN model stored in the model storage unit 105) corresponding to each of a plurality of articles, and performs inferences about the plurality of articles in parallel using the deep neural network models, a new article determination unit (for example, the new article determination unit 102) that determines whether an article included in the image is an unlearned article based on learned model information about the article and the image, and a new article learning unit (for example, the new article learning unit 103) that learns the deep neural network model corresponding to the article determined to be unlearned based on the image and initial model configuration information about the deep neural network model (for example, the initial model configuration information stored in the initial model configuration storage unit 104) when the article included in the image is determined to be an unlearned article are provided, and the new article learning unit adds the learned deep neural network model to the deep neural network models. The parallel deep neural network uses the deep neural network models including the added learned deep neural network model to perform the inferences about the plurality of articles including the article determined to be unlearned in parallel. Therefore, a new article can be added to a system without impairing actual operation. The inferences for the plurality of articles including the newly added article can be performed in parallel.

That is, according to the present embodiment, since learning is performed only for a new article without re-learning articles that have been learned, even if the number of articles increases, new learning can be completed in a short learning time for one article. Since the DNN model for each article is provided in parallel with each other and the plurality of articles are inferred at the same time, an inference time can be shortened. Furthermore, by learning a contracted DNN model and using the contracted DNN model for the inference, more DNN models can be operated in parallel, so that more articles can be recognized at the same time.

Second Embodiment

A second embodiment of the invention will be described with reference to FIGS. 6 to 9.

Figure 6:
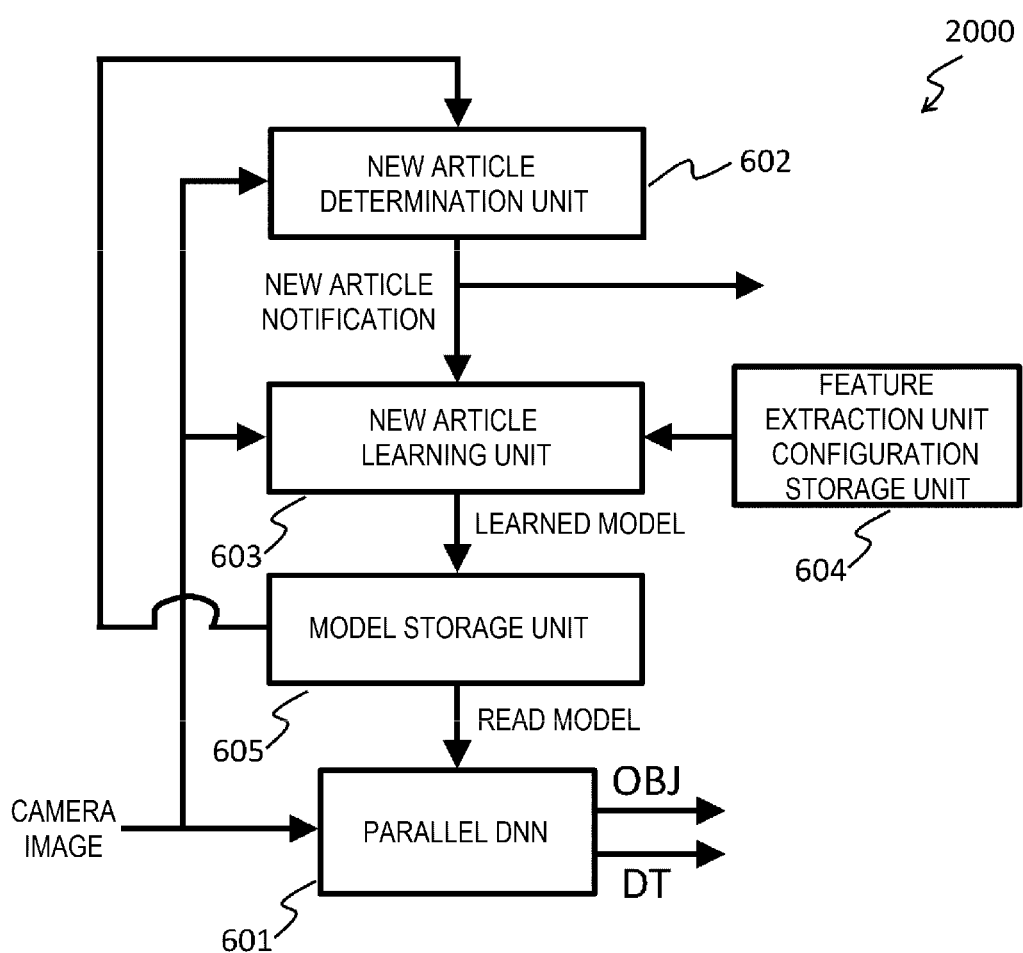
FIG. 6 is a diagram showing an arithmetic unit that performs learning and recognition of a second embodiment.

FIG. 6 shows a configuration of an arithmetic unit 2000 that performs learning and recognition according to the present embodiment. In the second embodiment, a configuration of each functional unit including a parallel DNN 601, a new article determination unit 602, and a new article learning unit 603 is different from that of the first embodiment, and the second embodiment is different from the first embodiment in that a feature extraction unit configuration storage unit 604 is provided instead of the initial model configuration storage unit 104. Therefore, in the following, points different from the first embodiment of each of these functional units will be described mainly.

Specifically, as will be described later, in the second embodiment, when the new article learning unit 603 receives a new article notification signal, the new article learning unit 603 learns a DNN model corresponding to a new article included in a camera image based on feature extraction unit configuration information stored in the feature extraction unit configuration storage unit 604. The DNN model learned by the new article learning unit 603 is sent by the new article learning unit 603 to a model storage unit 605 for storing. Then, by reading each DNN model including the newly learned DNN model, a new type of article can be recognized.

Figure 7:
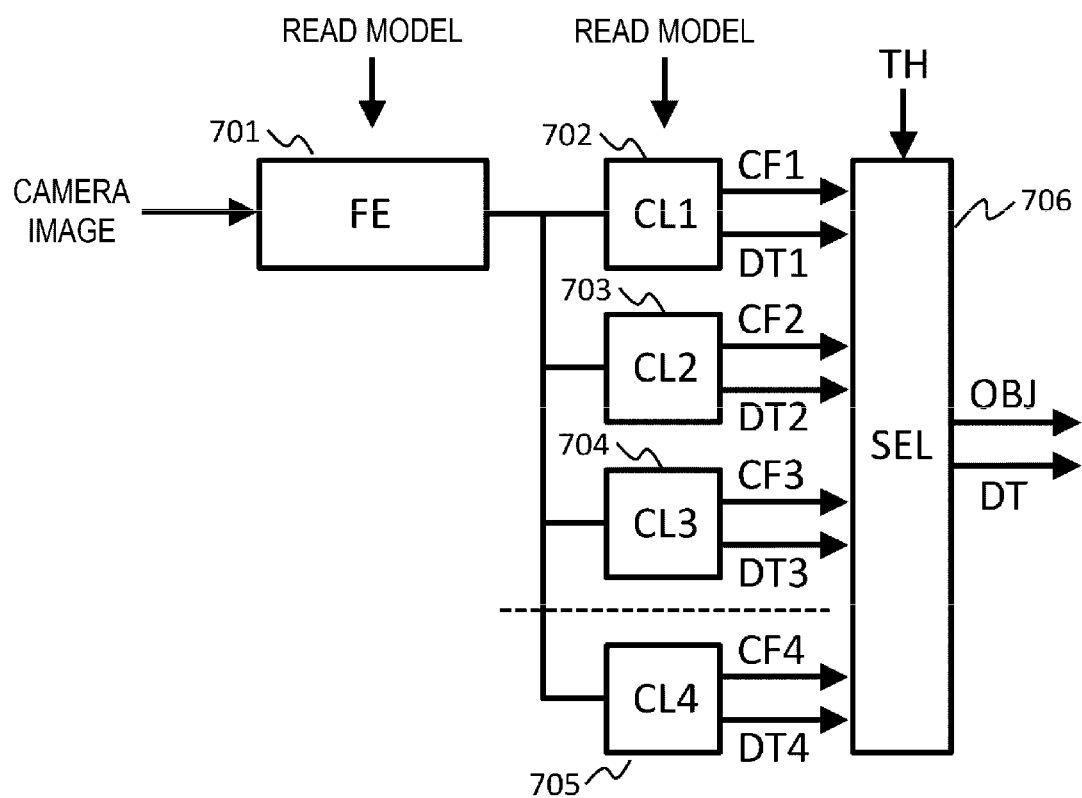
FIG. 7 is a diagram showing a parallel DNN of the second embodiment.

FIG. 7 shows a configuration of the parallel DNN 601. The parallel DNN 601 includes only one feature extraction unit (FE) 701, which is different from that of the first embodiment. The feature extraction unit is followed by identification units (CL) 702, 703, 704, and 705 provided in parallel. The feature extraction unit 701 and each CL constitute a DNN model for each article. In FIG. 7, the feature extraction unit 701 and CL1 constitute a DNN model for an article 1, the feature extraction unit 701 and CL2 constitute a DNN model for an article 2, and the feature extraction unit 701 and CL3 constitute a DNN model for an article 3. The feature extraction unit 701 and CL4 constitute a DNN model for a newly learned new article 4. That is, the feature extraction unit 701 is commonly used in the DNN model for each article. In this way, in the present embodiment, the DNN model for each article is implemented substantially in parallel with each other. The number of the DNN models that are provided in parallel in the parallel DNN 601 increases as a new article is encountered. The camera images are input to these parallelized DNN models and the inferences are performed at the same time for each article.

Then, each CL outputs a confidence value (CF) and a detection result (DT) as in the first embodiment. That is, CL1 outputs CF1 and DT1, CL2 outputs CF2 and DT2, CL3 outputs CF3 and DT3, and CL4 outputs CF4 and DT4.

Then, as in the first embodiment, the confidence value (CF) and the detection result (DT) from each CL are input to a selection unit (SEL) 706, and the selection unit (SEL) 706 selects the largest confidence value among the confidence values (CF) and outputs a type (OBJ) of the article and a detection result (DT) of the article.

Figure 8:
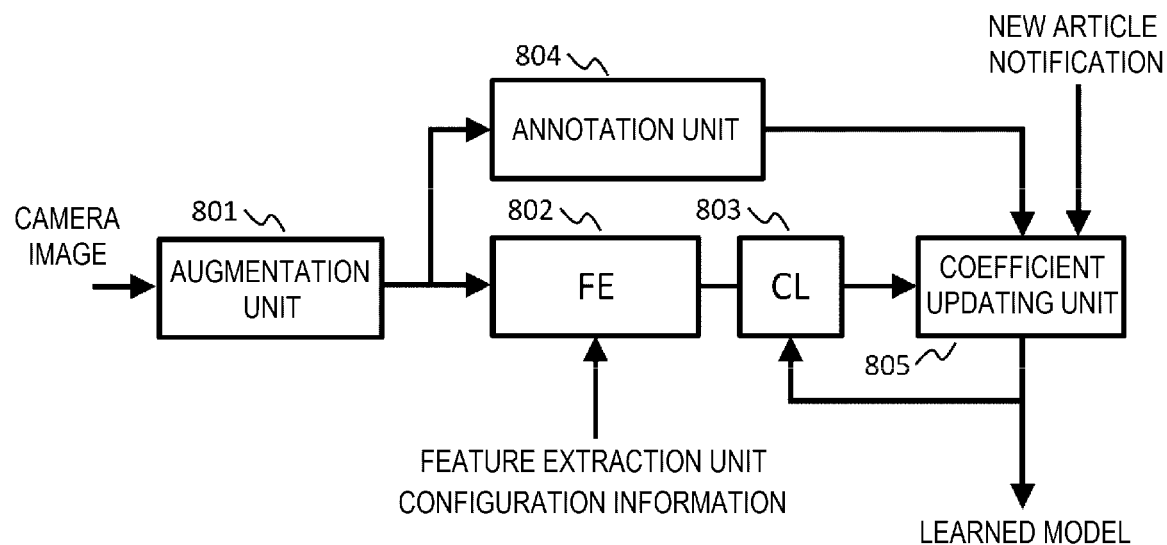
FIG. 8 is a diagram showing a new article learning unit of the second embodiment.

FIG. 8 shows a configuration of the new article learning unit 603. The camera image is input to an augmentation unit 801. The augmentation unit 801 exerts an effect of increasing the number of the camera images to an amount required for the deep learning as in the first embodiment.

An image padded by the augmentation unit 801 is input to a feature extraction unit (FE) 802. An output of the feature extraction unit (FE) 802 is input to an identification unit (CL) 803. The feature extraction unit (FE) 802 and the identification unit (CL) 803 constitute a DNN model for one article.

The padded image is also input to an annotation unit 804. As in the first embodiment, the annotation unit 804 annotates (tags) these images for the deep learning. Since a specific processing of the annotation unit 804 is the same as that of the first embodiment, description thereof will be omitted here.

An output of the identification unit (CL) 803 and an output of the annotation unit 804 are supplied to a coefficient updating unit 805. The new article notification signal is also input to the coefficient updating unit 805. Upon receiving the new article notification signal, the coefficient updating unit 805 starts learning the identification unit (CL) 803 in the DNN model. When the coefficient updating unit 805 is in learning, the current learning is continued even if the new article notification signal is received.

Before the learning, the feature extraction unit configuration information is read into the feature extraction unit (FE) 802. The feature extraction unit configuration information gives a value for a parameter group (a weighting coefficient and the like) that constitutes the feature extraction unit in the DNN model. During learning, the feature extraction unit (FE) 802 does not update a parameter by learning but fixes a parameter value, which is different from the first embodiment.

The coefficient updating unit 805 performs learning by sequentially updating the parameter groups of the identification unit (CL) 803 using an existing back propagation technique or the like.

The parameter groups of the identification unit (CL) 803 obtained by the above learning and the feature extraction unit configuration information are supplied to and stored in the model storage unit 605 by the coefficient updating unit 805 as learned models for the articles.

Figure 9:
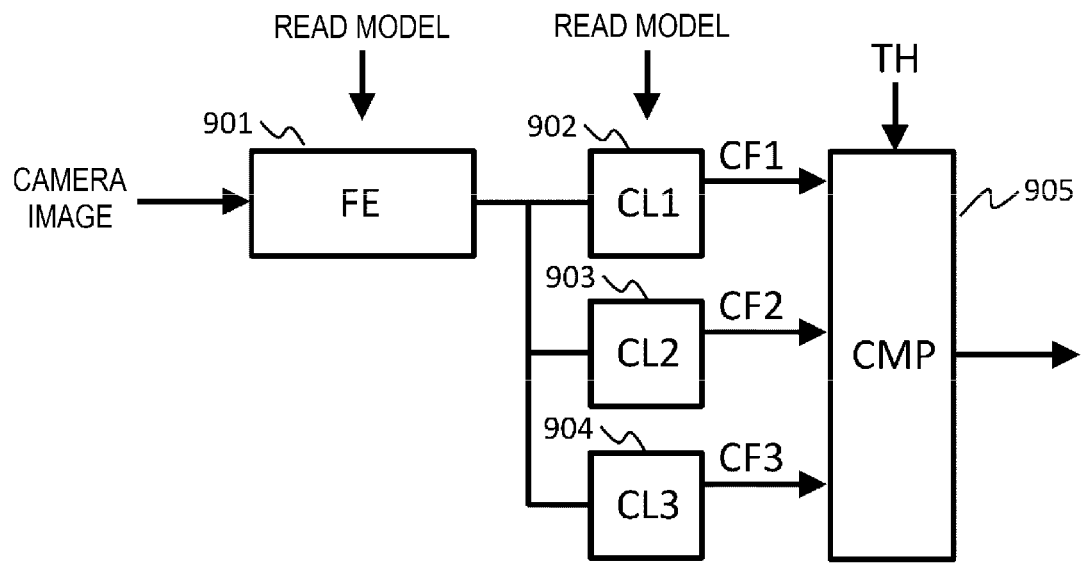
FIG. 9 is a diagram showing a new article determination unit of the second embodiment.

FIG. 9 shows a configuration of the new article determination unit 602. As in the first embodiment, the new article determination unit 602 is provided with learned DNN models in parallel. The new article determination unit 602 is provided with a common feature extraction unit (FE) 901 and subsequent parallelized identification units (CL) 902, 903, and 904. The feature extraction unit (FE) 901 reads out the feature extraction unit configuration information stored in the model storage unit 605. The identification units (CL) 902, 903, and 904 read the learned parameter groups for the article 1, the article 2, and the article 3 stored in the model storage unit 605, respectively. Therefore, the common feature extraction unit (FE) 901 and the identification units (CL) 902, 903, and 904 constitute the DNN models for the article 1, article 2, and article 3. The camera image is input to the feature extraction unit (FE) 901, and inference for each article is performed in parallel (simultaneously) with each other.

Each CL outputs the confidence value (CF). These confidence values (CF) are supplied to a comparison unit (CMP) 905. The threshold value (TH) is also supplied to the comparison unit (CMP) 905. Since a specific function of the comparison unit (CMP) 905 is the same as that of the first embodiment, description thereof will be omitted here.

Each of the above configurations and operations can be implemented by using a dedicated arithmetic unit, memory, CPU, or the like provided in hardware.

Therefore, in the present embodiment, a parallel deep neural network (for example, the parallel DNN 601) includes a feature extraction unit (for example, the feature extraction unit (FE) 701) that extracts a feature from a captured image of an article, and an identification unit (for example, each of the identification units (CL) 702 to 705) that outputs a confidence value indicating a probability that the article corresponding to a deep neural network model exists based on the extracted feature, and the feature extraction unit is shared for the plurality of articles.

Therefore, according to the present embodiment, since learning is performed only for a new article without re-learning articles that have been learned, even if the number of articles increases, new learning can be completed in a short learning time for one article. Since the DNN model for each article is provided in parallel with each other and the plurality of articles are inferred at the same time, an inference time can be shortened. Furthermore, in the present embodiment, in implementation of the DNN model for each article, required arithmetic unit resources and memories can be reduced by sharing the feature extraction unit. Therefore, more DNN models can be operated in parallel, so that more articles can be recognized at the same time.

Third Embodiment

A third embodiment of the invention will be described with reference to FIGS. 10 to 12.

Figure 10:
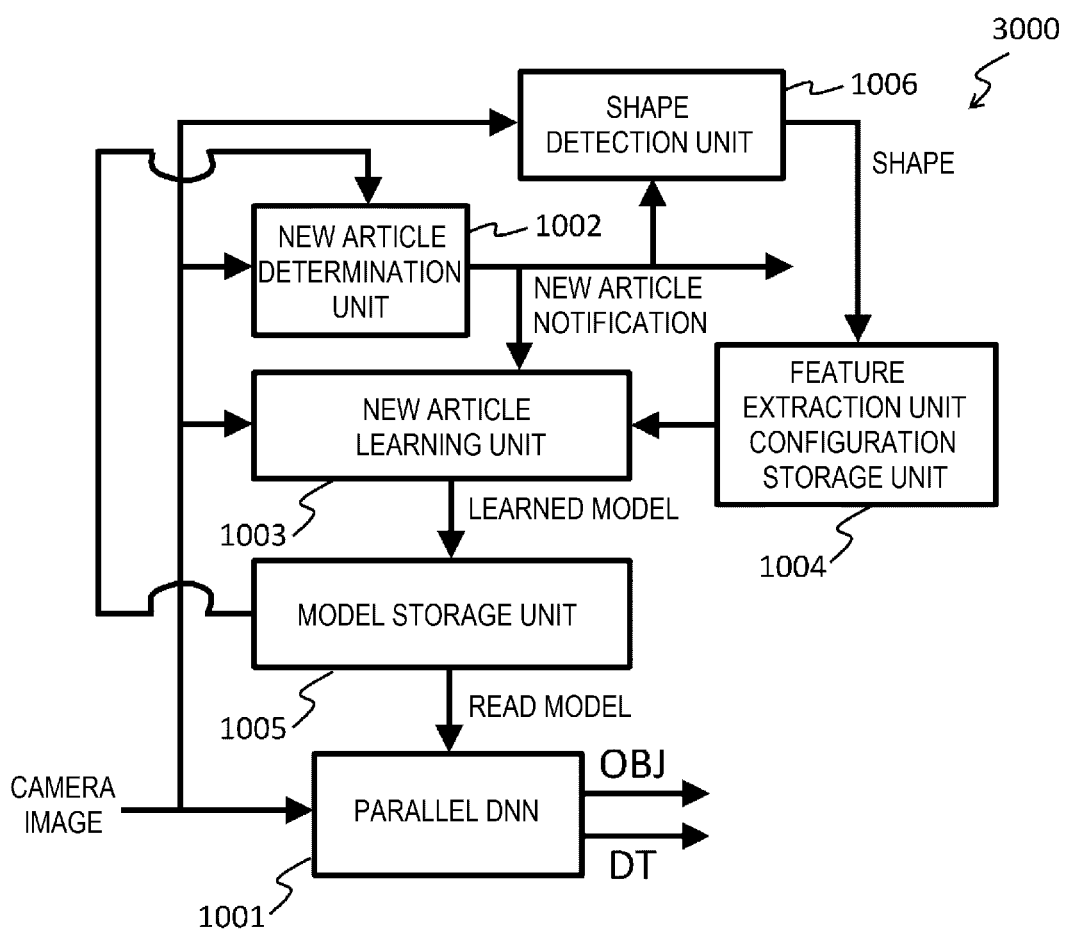
FIG. 10 is a diagram showing an arithmetic unit that performs learning and recognition of a third embodiment.

FIG. 10 shows a configuration of an arithmetic unit 3000 that performs learning and recognition according to the present embodiment. A configuration of each functional unit of a parallel DNN 1001 and a new article determination unit 1002 of the third embodiment is different from that of the second embodiment, and the third embodiment is different from the first embodiment and the second embodiment in that a shape detection unit 1006 is further provided. Therefore, in the following, points different from the first embodiment and the second embodiment of each of these functional units will be described mainly.

The shape detection unit 1006 detects a shape of an article included in a camera image when receiving a new article notification signal. The shape is a typical general shape of an article such as a box shape, a bottle shape, a cup shape, and a can shape. The shape detection unit 1006 transmits the detected shape to a feature extraction unit configuration storage unit 1004. As a method for the shape detection unit 1006 to detect the shape of the article, various known techniques in the related art such as edge detection can be used.

Specifically, as will be described later, in the third embodiment, when a new article learning unit 1003 receives a new article notification signal, the new article learning unit 1003 learns a DNN model corresponding to a new article included in a camera image based on feature extraction unit configuration information stored in the feature extraction unit configuration storage unit 1004.

The feature extraction unit configuration information stored in the feature extraction unit configuration storage unit 1004 is selected based on the shape transmitted to the feature extraction unit configuration storage unit 1004. That is, the feature extraction unit configuration storage unit 1004 stores the feature extraction unit configuration information for the various shapes such as the box shape, the bottle shape, the cup shape, and the can shape. For example, when the box shape is detected by the shape detection unit 1006, the new article learning unit 1003 reads the feature extraction unit configuration information for the box shape from the feature extraction unit configuration storage unit 1004. The DNN model learned by the new article learning unit 1003 is sent by the new article learning unit 1003 to a model storage unit 1005 for storing. Then, by reading each DNN model including the newly learned DNN model, a new type of article can be recognized.

Figure 11:
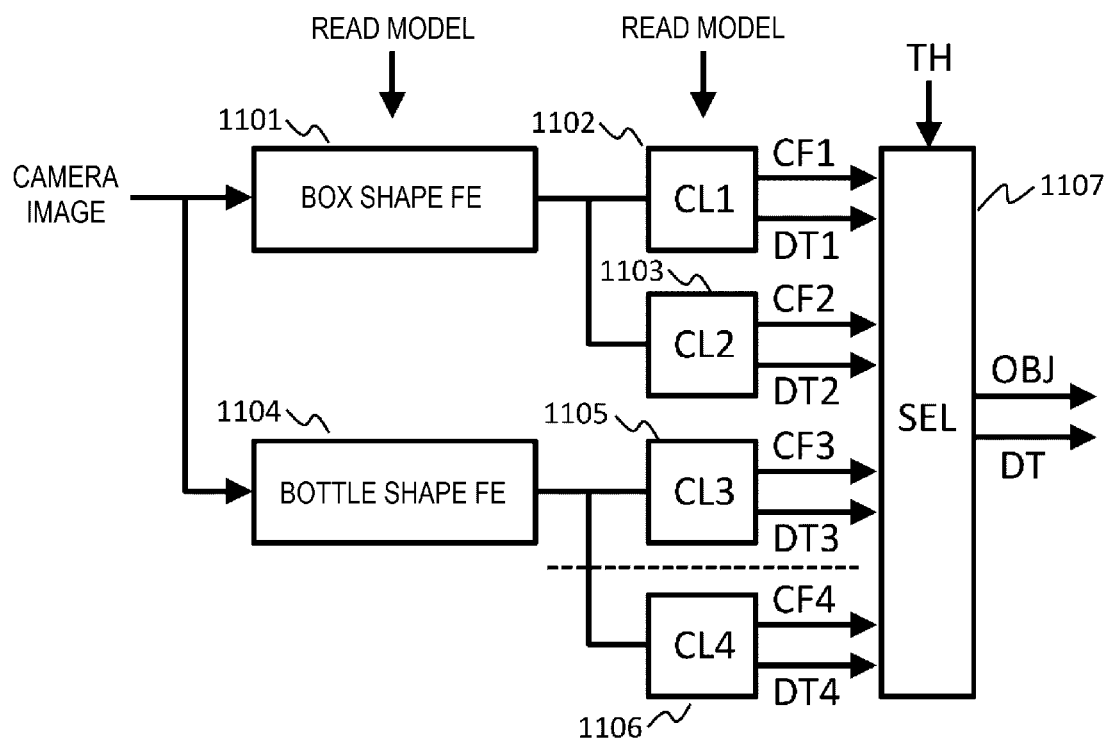
FIG. 11 is a diagram showing a parallel DNN of the third embodiment.

FIG. 11 shows a configuration of the parallel DNN 1001. The parallel DNN 1001 is provided with feature extraction units for each shape in parallel, which is different from the second embodiment. For example, in FIG. 11, the parallel DNN 1001 is provided with a box shape feature extraction unit (box shape FE) 1101 and a bottle shape feature extraction unit (bottle shape FE) 1104. Each feature extraction unit is followed by identification units (CL) provided in parallel with each other. For example, in FIG. 11, CL1 and CL2 are connected in parallel to an output of the box shape feature extraction unit (box shape FE) 1101. CL3 and CL4 are connected to an output of the bottle shape feature extraction unit (bottle shape FE) 1104.

That is, the box shape feature extraction unit (box shape FE) 1101 and CL1 constitute a DNN model for a box-shaped article 1, and the box shape feature extraction unit (box shape FE) 1101 and CL2 constitute a DNN model for a box-shaped article 2. The bottle shape feature extraction unit (bottle shape FE) 1104 and CL3 constitute a DNN model for a bottle-shaped article 3, and the bottle shape feature extraction unit (bottle shape FE) 1104 and CL4 constitute a DNN model for a newly learned bottle-shaped new article 4. That is, the box shape feature extraction unit (box shape FE) 1101 is commonly used in the DNN models for each box-shaped article. The bottle shape feature extraction unit (bottle shape FE) 1104 is commonly used in the DNN models for each bottle-shaped article.

In this way, in the present embodiment, the DNN model for each article is implemented substantially in parallel with each other. The number of the DNN models that are provided in parallel in the parallel DNN 1001 increases as a new article is encountered. The camera images are input to these parallelized DNN models and the inferences are performed at the same time for each article.

Then, each CL outputs a confidence value (CF) and a detection result (DT) as in the first embodiment and the second embodiment. That is, CL1 outputs CF1 and DT1, CL2 outputs CF2 and DT2, CL3 outputs CF3 and DT3, and CL4 outputs CF4 and DT4.

Then, as in the first embodiment and the second embodiment, the confidence value (CF) and the detection result (DT) from each CL are input to a selection unit (SEL) 1107, and the selection unit (SEL) 1107 selects the largest confidence value among the confidence values (CF) and outputs a type (OBJ) of the article and a detection result (DT) of the article.

The new article learning unit 1003 has a configuration shown in FIG. 8. The feature extraction unit configuration information read into the feature extraction unit (FE) 802 is read from the feature extraction unit configuration storage unit 1004 as described above. For example, when the box shape is detected by the shape detection unit 1006, the feature extraction unit configuration information for the box shape is read out. The new article learning unit 1003 operates in the same manner as in the second embodiment, learns an identification unit (CL) of a DNN model for an unlearned article (that is, a new article), and supplies the DNN model to the model storage unit 1005.

Figure 12:
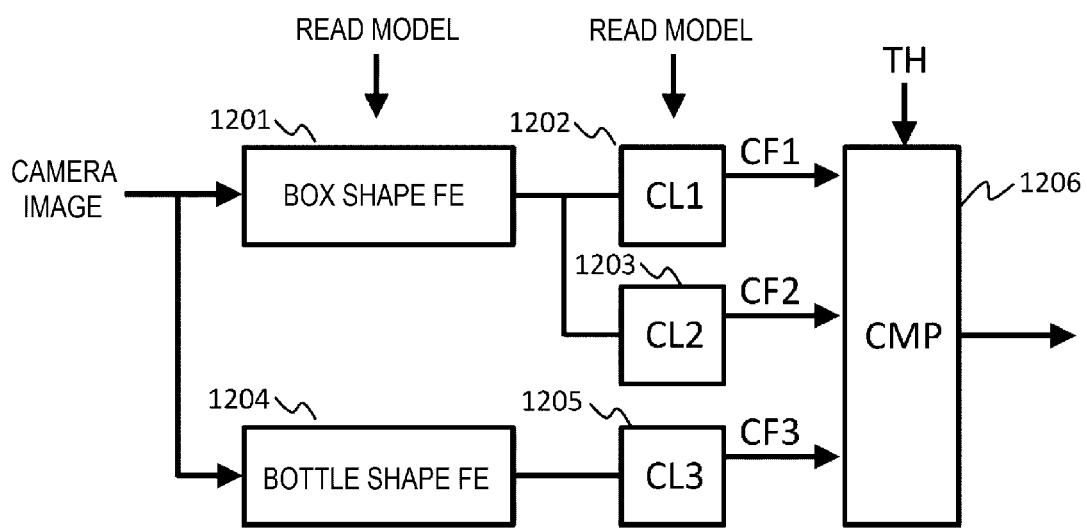
FIG. 12 is a diagram showing a new article determination unit of the third embodiment.

FIG. 12 shows a configuration of the new article determination unit 1002. As in the first embodiment, the new article determination unit 1002 is provided with learned DNN models in parallel. The new article determination unit 1002 is provided with feature extraction units (FE) for each shape in parallel, and is further provided with identification units (CL) following the feature extraction units (FE). For example, in FIG. 12, the new article determination unit 1002 is provided with a box shape feature extraction unit (box shape FE) 1201 and a bottle shape feature extraction unit (bottle shape FE) 1204 in parallel.

The box shape feature extraction unit (box shape FE) 1201 reads out the box shape feature extraction unit configuration information stored in the model storage unit 1005. The bottle shape feature extraction unit (bottle shape FE) 1204 reads out the bottle shape feature extraction unit configuration information stored in the model storage unit 1005. A learned parameter group for each of the article 1, the article 2, and the article 3 stored in the model storage unit 1005 is read into each of identification units (CL) 1202, 1203, and 1205, respectively.

The box shape feature extraction unit (box shape FE) 1201 and CL1 constitute a DNN model for the box-shaped article 1, and the box shape feature extraction unit (box shape FE) 1201 and CL2 constitute a DNN model for the box-shaped article 2. The bottle shape feature extraction unit (bottle shape FE) 1204 and CL3 constitute a DNN model for the bottle-shaped article 3. The camera image is input to the feature extraction unit (FE) for each shape, and inference for each article is performed in parallel (simultaneously) with each other.

Each CL outputs the confidence value (CF). These confidence values (CF) are supplied to a comparison unit (CMP) 1206. The threshold value (TH) is also supplied to the comparison unit (CMP) 1206. Since a specific function of the comparison unit (CMP) 1206 is the same as that of the first embodiment and the second embodiment, description thereof will be omitted here.

Each of the above configurations and operations can be implemented by using a dedicated arithmetic unit, memory, CPU, or the like provided in hardware.

Therefore, in the present embodiment, a shape detection unit (for example, the shape detection unit 1006) that detects a shape of an article from a captured image of the article is further provided, and a new article learning unit (for example, the new article learning unit 1003) learns a deep neural network model corresponding to the article included in the image based on configuration information indicating a feature corresponding to the detected shape of the article. A parallel deep neural network (for example, the parallel DNN 1001) includes a feature extraction unit (for example, the box shape feature extraction unit (FE) 1101 and the bottle shape feature extraction unit (FE) 1104) that extracts a feature from the image, and an identification unit (for example, each of the identification units (CL) 1102 to 1106) that outputs a confidence value indicating a probability that the article corresponding to the deep neural network model exists based on the extracted feature, and the feature extraction unit is shared for each detected shape of the article.

Therefore, according to the present embodiment, since learning is performed only for a new article without re-learning articles that have been learned, even if the number of articles increases, new learning can be completed in a short learning time for one article. Since the DNN model for each article is provided in parallel with each other and the plurality of articles are inferred at the same time, an inference time can be shortened.

Furthermore, in the present embodiment, in implementation of the DNN model for each article, required arithmetic unit resources and memories can be reduced by sharing the feature extraction unit of the articles belonging to the same shape. Therefore, more DNN models can be operated in parallel, so that more articles can be recognized at the same time.

Furthermore, in the present embodiment, since the feature extraction unit is not shared for all the articles, but only for the articles belonging to the same shape, it is possible to provide a feature extraction unit dedicated to each shape. Therefore, the article can be recognized with a higher accuracy.

Fourth Embodiment

A fourth embodiment of the invention will be described with reference to FIGS. 13 and 14.

Figure 13:
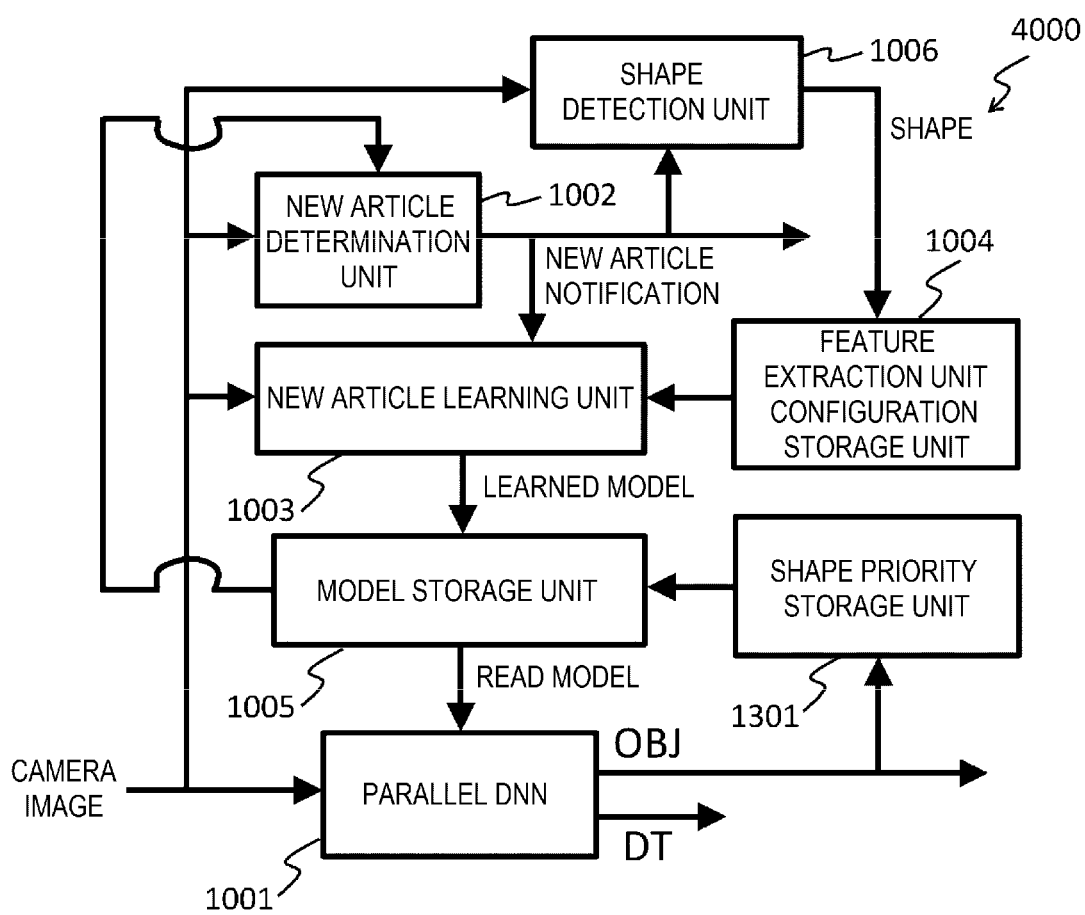
FIG. 13 is a diagram showing an arithmetic unit that performs learning and recognition of a fourth embodiment.

FIG. 13 shows a configuration of an arithmetic unit 4000 that performs learning and recognition according to the present embodiment. The fourth embodiment is different from the third embodiment (FIG. 10) in that a shape priority storage unit 1301 is further provided.

As in the third embodiment (FIG. 10), a DNN model for a new article is learned, and the learned model is stored in the model storage unit 1005. The parallel DNN 1001 reads a plurality of DNN models from the model storage unit 1005 and performs inferences for a plurality of articles at the same time.

In the present embodiment, a case is assumed where among a plurality of learned DNN models stored in the model storage unit 1005, only some of the learned DNN models can be read into the parallel DNN 1001 at the same time considering constraints of computing resources and memory resources installed in hardware. Therefore, the shape priority storage unit 1301 stores a priority regarding a shape when the parallel DNN 1001 reads the DNN model.

As shown in FIG. 13, the shape priority storage unit 1301 is supplied with a recognition result (OBJ) of a type of an article from the parallel DNN 1001. The shape priority storage unit 1301 holds priority information regarding the shape, which is updated based on the recognition result (OBJ). The updated priority information is transmitted to the model storage unit 1005. The parallel DNN 1001 reads a plurality of DNN models from the model storage unit 1005 based on the priority information and performs inferences in parallel using the plurality of read DNN models.

FIG. 14 shows a time chart of the present embodiment. During a first period, the priorities regarding the shapes are ranked in an order from the highest priority as a box shape, a bottle shape, a cup shape, and a can shape. This information is stored in the shape priority storage unit 1301.

During the first period, first, DNN models of an article 1 and an article 2, which are articles with the box shape having the highest priority, are read from the model storage unit 1005 into the parallel DNN 1001, and the parallel DNN 1001 performs inferences for the article 1 and the article 2 in parallel.

FIG. 14 shows a case where the article in the camera image during the first period is neither the article 1 nor the article 2. Therefore, the recognition result (OBJ) of the type of the article is 0, which indicates that the article is neither the article 1 nor the article 2. The parallel DNN 1001 reads this recognition result (OBJ=0) from the shape priority storage unit 1301 and transmits the recognition result to the model storage unit 1005. The parallel DNN 1001 receives the recognition result and reads, from the model storage unit 1005, DNN models of an article 3 and an article 4, which are articles with the bottle shape having the next highest priority, and performs the inferences in parallel.

FIG. 14 shows a case where the article in the camera image during the first period is the article 3 with the bottle shape. Therefore, a recognition result (OBJ) of a type of the article is 3, which indicates that the article is the article 3. This recognition result (OBJ=3) is transmitted to the shape priority storage unit 1301.

The parallel DNN 1001 determines that recognition for the image is completed, and updates the priority information regarding the shape stored in the shape priority storage unit 1301 in order to recognize a next image. Since the shape priority storage unit 1301 also holds information on a correspondence between a value of OBJ and the shape, if OBJ=3, it can be known that the shape of the article is the bottle shape.

The parallel DNN 1001 predicts that an article included in a next image is likely to have the same bottle shape as the article 3 currently detected, and raises a priority regarding the bottle shape stored in the shape priority storage unit 1301 to the highest priority. At the same time, the parallel DNN 1001 also updates the ranking of the shapes other than the bottle shape, but maintains a priority correlation among these shapes. As a result, as shown in a second period in FIG. 14, the ranking of the shapes is updated as the bottle shape, the box shape, the cup shape, and the can shape from the highest priority, and is stored in the shape priority storage unit 1301 as the priority information regarding the shapes. The priority information regarding the shapes is transmitted to the model storage unit 1005.

During the second period, the parallel DNN 1001 first reads the DNN models of the article 3 and the article 4, which are articles with the bottle shape having the highest priority, from the model storage unit 1005 based on the priority information regarding the shapes, and performs the inferences in parallel.

FIG. 14 shows a case where the article in the camera image during the second period is neither the article 3 nor the article 4. Therefore, the recognition result (OBJ) of the type of the article is 0, which indicates that the article is neither the article 3 nor the article 4. The parallel DNN 1001 reads this recognition result (OBJ=0) from the shape priority storage unit 1301 and transmits the recognition result to the model storage unit 1005. The parallel DNN 1001 receives the recognition result and reads, from the model storage unit 1005, the DNN models of the article 1 and the article 2, which are articles with the box shape having the next highest priority, and performs the inferences in parallel.

FIG. 14 shows a case where the article in the camera image during the second period is neither the article 1 nor the article 2. Therefore, the recognition result (OBJ) of the type of the article is 0, which indicates that the article is neither the article 1 nor the article 2. The parallel DNN 1001 reads this recognition result (OBJ=0) from the shape priority storage unit 1301 and transmits the recognition result to the model storage unit 1005. The parallel DNN 1001 receives the recognition result and reads, from the model storage unit 1005, DNN models of an article 5 and an article 6, which are articles with the cup shape having the next highest priority, and performs the inferences in parallel.

FIG. 14 shows a case where the article in the camera image during the second period is the article 6 with the cup shape. Therefore, a recognition result (OBJ) of a type of the article is 6, which indicates that the article is the article 6. This recognition result (OBJ=6) is transmitted to the shape priority storage unit 1301.

The parallel DNN 1001 determines that recognition for the image is completed, and updates the priority information regarding the shape stored in the shape priority storage unit 1301 in order to recognize a next image. Since the shape priority storage unit 1301 also holds information on a correspondence between a value of OBJ and the shape, if OBJ=6, it can be known that the shape of the article is the cup shape.

The parallel DNN 1001 predicts that an article included in a next image is likely to have the same cup shape as the article 6 currently detected, and raises a priority regarding the cup shape stored in the shape priority storage unit 1301 to the highest priority. At the same time, the parallel DNN 1001 also updates the ranking of the shapes other than the cup shape, but maintains a priority correlation among these shapes. As a result, as shown in a third period in FIG. 14, the ranking of the shapes is updated as the cup shape, the bottle shape, the box shape, and the can shape from the highest priority, and is stored in the shape priority storage unit 1301 as the priority information regarding the shapes. The priority information regarding the shapes is transmitted to the model storage unit 1005. The same operation is performed after the third period.

Therefore, in the present embodiment, a parallel deep neural network performs inferences for a plurality of articles including a newly added article by preferentially using a deep network model corresponding to an article with the same shape as a previously detected article.

Therefore, according to the present embodiment, each effect in the third embodiment can be obtained. Further, when it is necessary to recognize a plurality of types of articles and hardware resources are constrained, an average value of a recognition time of articles can be shortened. Therefore, a work throughput can be improved. The above-mentioned merit can be obtained in logistics and production fields in which articles with the same shape often appear consecutively.

Fifth Embodiment

A fifth embodiment of the invention will be described with reference to FIG. 15.

Figure 15:
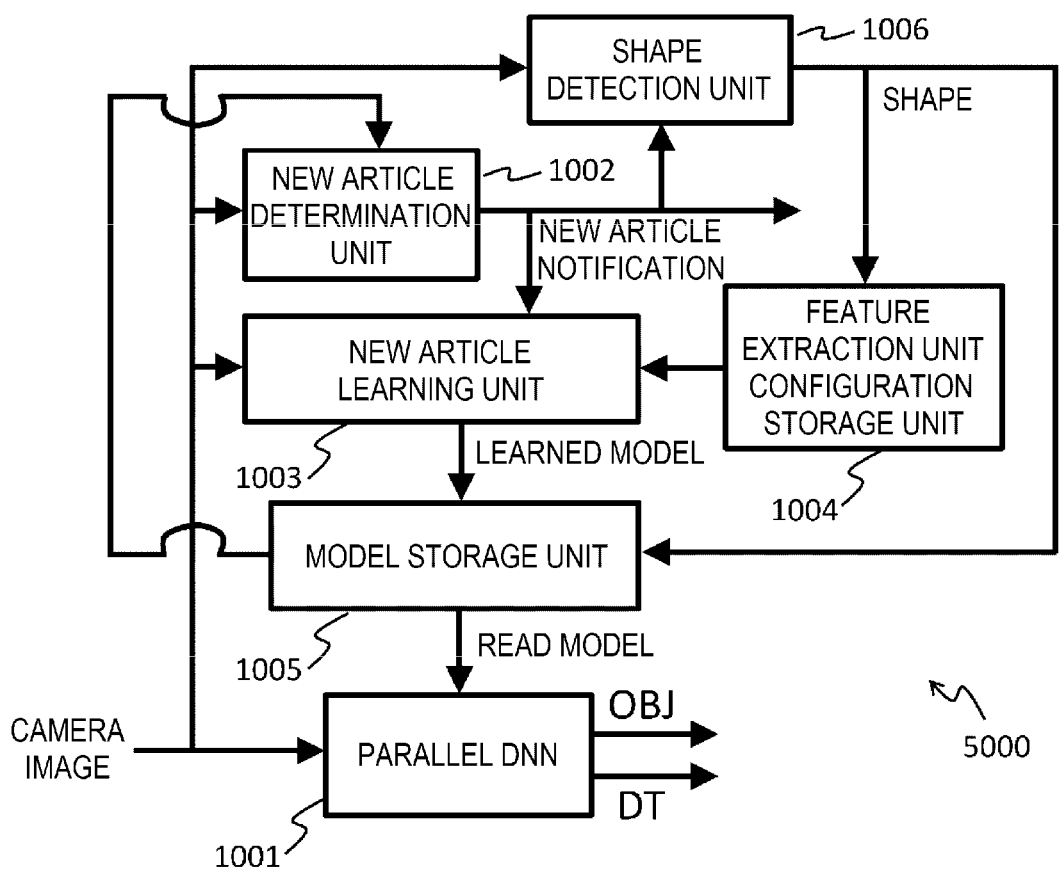
FIG. 15 is a diagram showing an arithmetic unit that performs learning and recognition of a fifth embodiment.

FIG. 15 shows a configuration of an arithmetic unit 5000 that performs learning and recognition according to the present embodiment. As in the third embodiment (FIG. 10), a DNN model for a new article is learned, and the learned model is stored in the model storage unit 1005. The parallel DNN 1001 reads a plurality of DNN models from the model storage unit 1005 and performs inferences for a plurality of articles at the same time.

The fifth embodiment is different from the third embodiment (FIG. 10) in that a DNN model to be read from the model storage unit 1005 into the parallel DNN 1001 is selected based on a shape detection result obtained by the shape detection unit 1006.

As in the fourth embodiment, in the present embodiment, a case is also assumed where among a plurality of learned DNN models stored in the model storage unit 1005, only some of the learned DNN models can be read into the parallel DNN 1001 at the same time considering constraints of computing resources and memory resources installed in hardware.

In the present embodiment, the shape detection unit 1006, which is used only for learning in other embodiments, is also used for inference. That is, when the shape detection unit 1006 detects that an article included in a camera image has, for example, a box shape, the parallel DNN 1001 reads DNN models of an article 1 and an article 2 with the box shape from the model storage unit 1005, and simultaneously performs an inference for the article with the box shape. Similarly, when the shape detection unit 1006 detects that an article included in a camera image has a bottle shape, the parallel DNN 1001 reads DNN models of an article 3 and an article 4 with the bottle shape from the model storage unit 1005, and simultaneously performs an inference for the article with the bottle shape.

According to the present embodiment, each effect in the third embodiment can be obtained. Furthermore, a plurality of types of articles can be recognized even when hardware resources are constrained. Since a recognition time increases by a shape detection time required by the shape detection unit 1006, when articles with the same shape often appear consecutively, the recognition time is shorter in the fourth embodiment.

However, in the present embodiment, since a shape of an article can be specified in advance, the article can be detected by reading a plurality of DNN models of the corresponding shape into the parallel DNN 1001 once, which is different from the fourth embodiment. Therefore, when articles having different shapes appear disorderly, the recognition time can be shortened as compared with the fourth embodiment.

Sixth Embodiment

A sixth embodiment of the invention will be described with reference to FIGS. 16A and 16B.

Figure 16A:
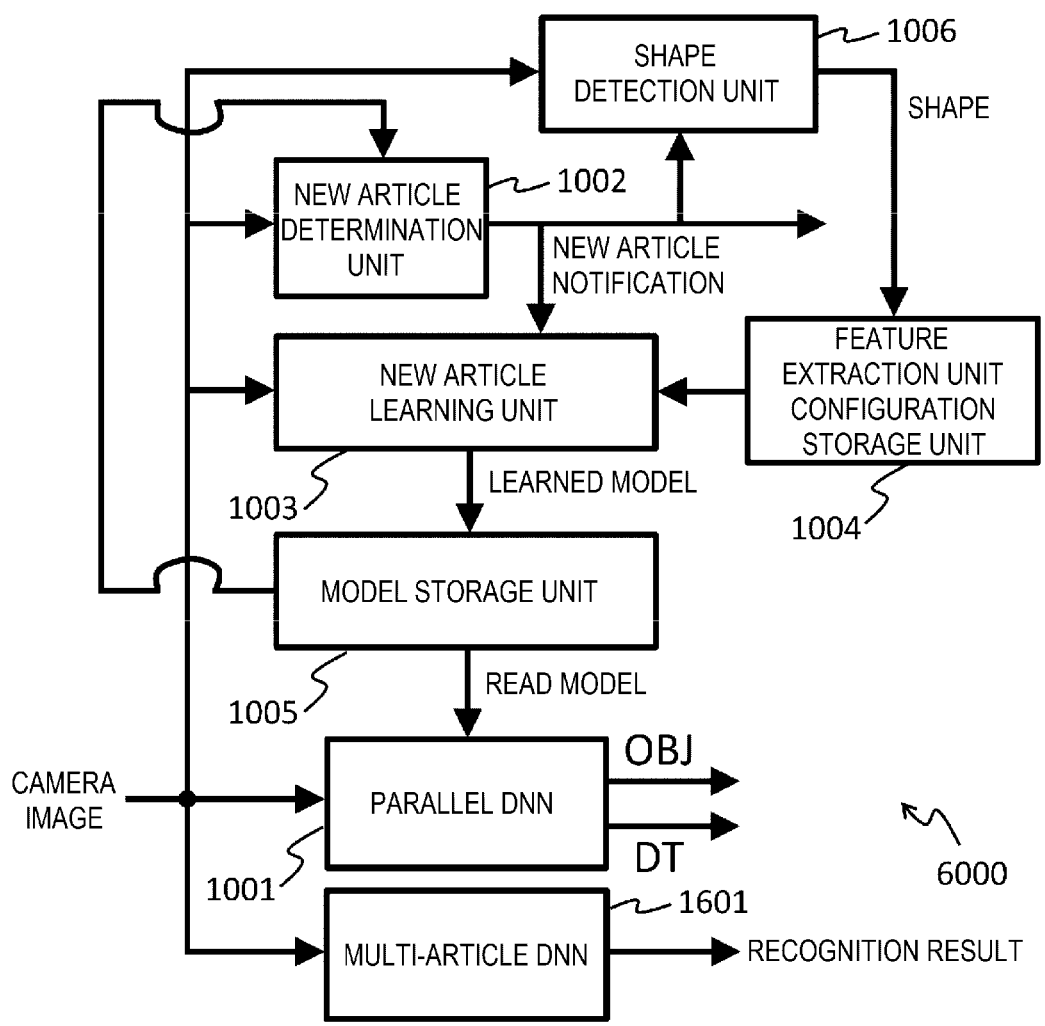
FIG. 16A is a diagram showing an arithmetic unit that performs learning and recognition of a sixth embodiment.

FIG. 16A shows a configuration of an arithmetic unit 6000 that performs learning and recognition according to the present embodiment. As in the third embodiment (FIG. 10), a DNN model for a new article is learned, and the learned model is stored in the model storage unit 1005. The parallel DNN 1001 reads a plurality of DNN models from the model storage unit 1005 and performs inferences for a plurality of articles at the same time.

The sixth embodiment is different from the third embodiment (FIG. 10) in that a multi-article deep neural network (hereinafter, referred to as multi-article DNN) 1601 is further provided. The multi-article DNN 1601 is constituted by pre-learned DNN models for predetermined types, for example, 10 types or 100 types of articles.

The parallel DNN 1001 and the multi-article DNN 1601 are used in combination to perform inferences for a plurality of articles in parallel with respect to camera images. A final recognition result of an article is obtained based on the OBJ and the DT obtained from the parallel DNN 1001 and a recognition result obtained from the multi-article DNN 1601.

Figure 16B:
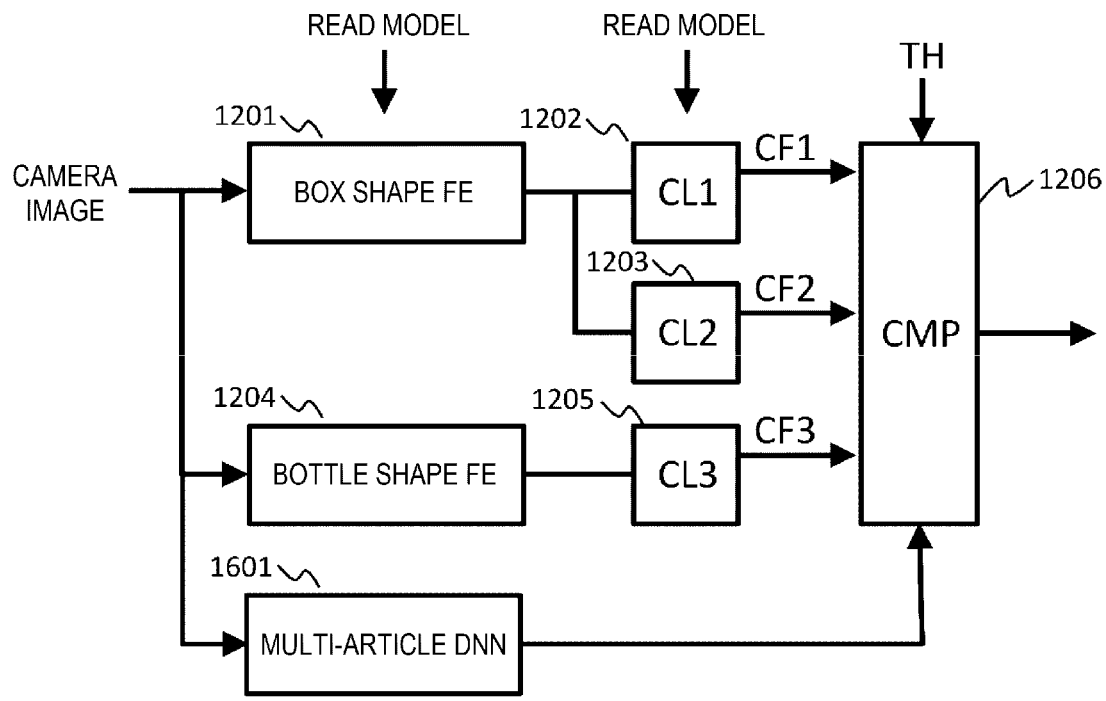
FIG. 16B is a diagram showing a new article determination unit of the sixth embodiment.

As shown in FIG. 16B, the new article determination unit 1002 further includes the same DNN model as the multi-article DNN 1601 in addition to the configuration shown in FIG. 12. The DNN model outputs a confidence value for each article with respect to a camera image. As shown in FIG. 12, similar to the description in the third embodiment, a comparison unit (CMP) determines whether an article is a new article (that is, an unlearned article) using a confidence value (CF) obtained from each identification unit (CL) and a confidence value obtained from the DNN model, and outputs a new article notification signal when the article is a new article.

Therefore, in the present embodiment, a multi-article deep neural network (for example, the multi-article DNN 1601) that is constituted by a learned deep neural network model for a predetermined type of article is further provided, and a parallel deep neural network and the multi-article deep neural network perform inferences for a plurality of articles in parallel.

Therefore, according to the present embodiment, each effect in the third embodiment can be obtained. Further, since the multi-article DNN can be created exclusively, a hardware implementing efficiency can be improved and required computing resources and memory resources can be reduced.

Seventh Embodiment

A seventh embodiment of the invention will be described with reference to FIG. 17.

Figure 17:
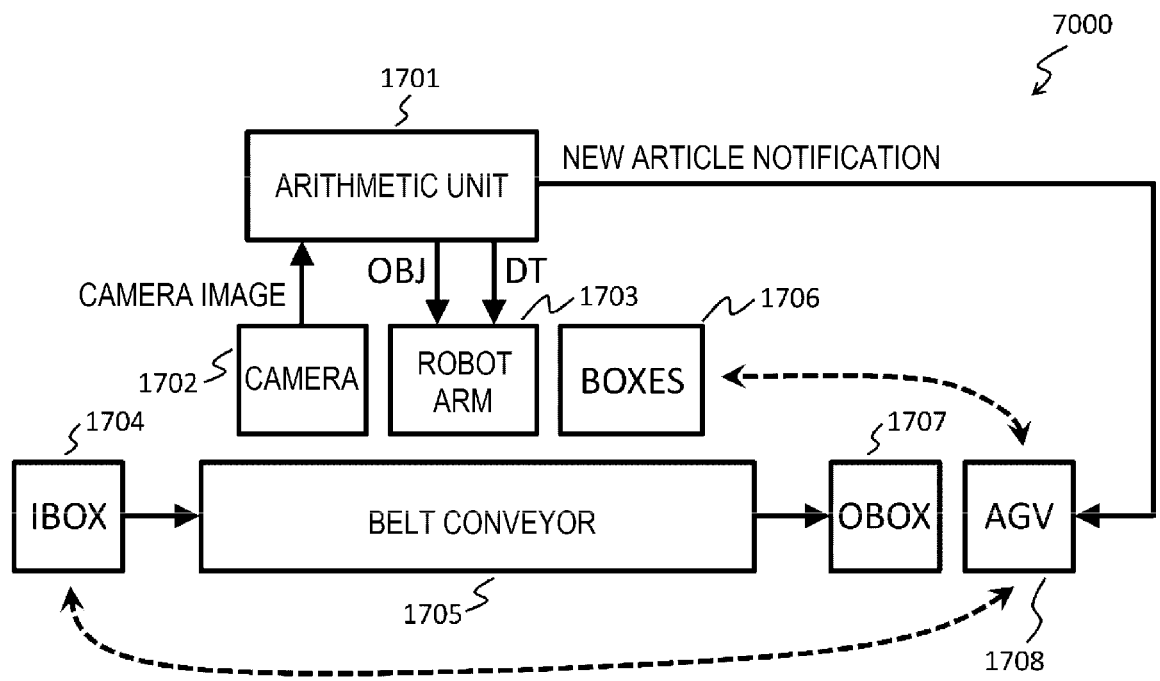
FIG. 17 is a diagram showing a system that performs learning and recognition of a seventh embodiment.

FIG. 17 shows a configuration of a learning recognition system 7000 that performs learning and recognition according to the present embodiment. In FIG. 17, an arithmetic unit 1701 is an arithmetic unit that performs learning and recognition as described in each of the above embodiments.

Articles are supplied from an input side box (IBOX) 1704 to a belt conveyor 1705 one after another. A camera 1702 captures the articles flowing over the belt conveyor 1705.

A camera image captured by the camera 1702 is input to the arithmetic unit 1701. As described in each of the above embodiments, the arithmetic unit 1701 outputs a type (OBJ) of an article included in the camera image and a detection result (DT) of the article to a robot arm 1703.

The robot arm 1703 includes a robot arm body, a controller that controls the robot arm body, and a computer that sends an instruction to the controller. The computer receives the OBJ and the DT. The detection result (DT) is coordinates of a bounding box, coordinates of a contour, coordinates of a graspable region, or the like for the detected article.

The computer determines a trajectory of the robot arm body for grasping the article based on the detection result (DT). Further, an instruction is sent to the controller to move the robot arm body along the obtained trajectory. The controller moves the robot arm body according to the instruction and grasps the article.

Next, the computer obtains a trajectory of the robot arm body for arranging the grasped article based on a determination result of type (OBJ) of the article. The article is arranged in a box corresponding to the type of the article among sorting box rows (BOXES) 1706.

When an unlearned article flows over the belt conveyor 1705, the arithmetic unit 1701 determines that the article is a new article and learns a new DNN model as described in the above embodiments. A new article notification signal is sent to an automatic guided vehicle (AGV) 1708.

When the determination result of type (OBJ) of the article received from the arithmetic unit 1701 is 0, the computer of the robot arm 1703 determines that the article is an unlearned article and does not make the robot arm body grasp the article. Therefore, the article flows over the belt conveyor 1705 to an end and is recovered by an output side box (OBOX) 1707.

Upon receiving the new article notification signal, the automatic guided vehicle (AGV) 1708 carries the output side box (OBOX) 1707 at an appropriate timing and pours the recovered unlearned article into the input side box (IBOX) 1704. Then, the automatic guided vehicle (AGV) 1708 takes the output side box (OBOX) 1707 back to an original place (that is, the end position of the belt conveyor). The recovered unlearned article is supplied to the belt conveyor 1705 again from the input side box (IBOX) 1704. The recovery and resupply are repeated in the same manner as described above until learning is completed, and once the learning is completed, the article can be recognized by the arithmetic unit 1701, so that the article is grasped by the robot arm 1703 and sorted into a corresponding box among the sorting box rows (BOXES) 1706.

The automatic guided vehicle (AGV) 1708 carries a box in which sorting is completed among the sorting box rows (BOXES) 1706 to a required place and replaces the box with a new box.

Therefore, in the present embodiment, a camera (for example, the camera 1702) that captures an image of an article, a transport device (for example, the belt conveyor 1705) that transports the article from an input side to an output side, a control device (for example, the robot arm 1703) that controls grasping of the article transported by the transport device, and an information processing device (for example, the arithmetic unit 1701) that performs learning using a deep neural network are provided. The information processing device includes a parallel deep neural network (for example, the parallel DNN 101) that inputs the image of the article captured by the camera to a deep neural network model corresponding to each of a plurality of articles, and performs inferences about the plurality of articles in parallel using the deep neural network models, a new article determination unit (for example, the new article determination unit 102) that determines whether an article included in the image is an unlearned article based on learned model information about the article and the image, and a new article learning unit (for example, the new article learning unit 103) that learns a deep neural network model corresponding to the article determined to be unlearned based on the image and initial model configuration information about the deep neural network model (for example, the initial model configuration information stored in the initial model configuration storage unit 104) when the article included in the image is determined to be an unlearned article. The new article learning unit adds the learned deep neural network model to the deep neural network models. The parallel deep neural network outputs a recognition result of the article included in the image by using the deep neural network models including the added learned deep neural network model. The control device controls the grasping of the article based on the recognition result.

Therefore, according to the present embodiment, it is possible to sort articles fully automatically, and it is also possible to respond to an appearance of a new article.

Eighth Embodiment

Figure 18:
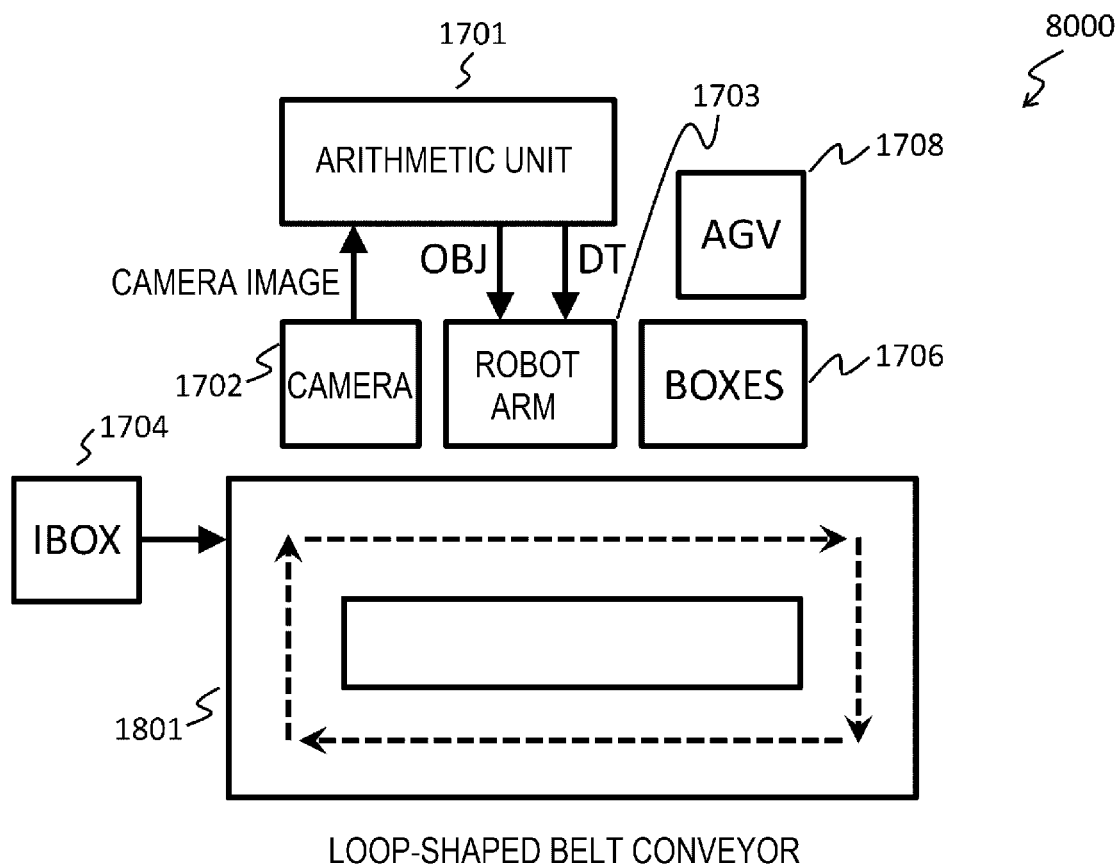
FIG. 18 is a diagram showing a system that performs learning and recognition of an eighth embodiment.

An eighth embodiment of the invention will be described with reference to FIG. 18.

In the present embodiment, a configuration of a learning recognition system 8000 is shown, in which the belt conveyor 1705 in the seventh embodiment is replaced with a loop-shaped belt conveyor 1801. In this way, it is not necessary to recover an unlearned article (that is, a new article) using the output side box (OBOX) 1707, which is different from the seventh embodiment. That is, the unlearned article is not grasped by the robot arm 1703, but circulates on the loop-shaped belt conveyor 1801, and returns to an entrance of the loop-shaped belt conveyor 1801 again.

Therefore, in the present embodiment, a control device (for example, the robot arm 1703) controls grasping of an article transported by a loop-shaped transport device.

Therefore, as in the seventh embodiment, it is possible to sort articles fully automatically, and it is also possible to respond to an appearance of a new article. Furthermore, the output side box (OBOX) of the belt conveyor is unnecessary, and it is not necessary to carry the output side box (OBOX) by the automatic guided vehicle (AGV).

What is claimed is:

1. An information processing device, comprising:
    a parallel deep neural network configured to input a captured image of an article to deep neural network models respectively corresponding to a plurality of articles and perform inferences about the plurality of articles in parallel using the deep neural network models;
    a new article determination unit configured to determine whether an article included in the image is an unlearned article based on learned model information about the articles and the image; and
    a new article learning unit configured to learn a deep neural network model corresponding to the article determined to be unlearned based on the image and initial model configuration information about the deep neural network model when the article included in the image is determined to be an unlearned article; and
    a shape detection unit configured to detect a shape of the article from the image,
    wherein the new article learning unit adds the learned deep neural network model to the deep neural network models,
    wherein the new article learning unit learns the deep neural network model corresponding to the article included in the image based on configuration information indicating a feature corresponding to the detected shape of the article, and
    wherein the parallel deep neural network includes:
        a feature extraction unit configured to extract a feature from the image, and
        an identification unit configured to output a confidence value indicating a probability that an article corresponding to the deep neural network model exists based on the extracted feature, and
    wherein the feature extraction unit is shared for each detected shape of the article.

2. The information processing device according to claim 1,
    wherein the parallel deep neural network uses the deep neural network models including the added learned deep neural network model to perform inferences about a plurality of articles including the article determined to be unlearned in parallel.

3. The information processing device according to claim 1,
    wherein the new article learning unit performs the learning without setting a part of parameters of the deep neural network model corresponding to the article determined to be unlearned.

4. The information processing device according to claim 1,
    wherein the parallel deep neural network includes:
        a feature extraction unit configured to extract a feature from the image, and
        an identification unit configured to output a confidence value indicating a probability that an article corresponding to the deep neural network model exists based on the extracted feature, and
    wherein the feature extraction unit is shared for the plurality of articles.

5. The information processing device according to claim 1,
    wherein the parallel deep neural network performs the inferences by preferentially using a deep network model corresponding to an article with a shape the same as that of a previously detected article.

6. The information processing device according to claim 1, further comprising:
    a multi-article deep neural network that is constituted by a learned deep neural network model for a predetermined type of article,
    wherein the parallel deep neural network and the multi-article deep neural network perform inferences for the plurality of articles in parallel.

7. A learning recognition system, comprising:
    a camera configured to capture an image of an article;
    a transport device configured to transport an article from an input side to an output side;
    a control device configured to control grasping of an article transported by the transport device; and
    an information processing device configured to perform learning using a deep neural network,
    wherein the information processing device includes:
        a parallel deep neural network configured to input an image of an article captured by the camera to deep neural network models respectively corresponding to a plurality of articles and perform inferences about the plurality of articles in parallel using the deep neural network models,
        a new article determination unit configured to determine whether an article included in the image is an unlearned article based on learned model information about the articles and the image, a new article learning unit configured to learn a deep neural network model corresponding to the article determined to be unlearned based on the image and initial model configuration information about the deep neural network model when the article included in the image is determined to be an unlearned article, and a shape detection unit configured to detect a shape of the article from the image, wherein the new article learning unit adds the learned deep neural network model to the deep neural network models, wherein the parallel deep neural network outputs a recognition result of the article included in the image by using deep neural network models including the added learned deep neural network model, wherein the control device controls grasping of the article based on the recognition result, wherein the new article learning unit learns the deep neural network model corresponding to the article included in the image based on configuration information indicating a feature corresponding to the detected shape of the article, wherein the parallel deep neural network includes:

a feature extraction unit configured to extract a feature from the image, and an identification unit configured to output a confidence value indicating a probability that an article corresponding to the deep neural network model exists based on the extracted feature, and wherein the feature extraction unit is shared for each detected shape of the article.

8. The learning recognition system according to claim 7, wherein the control device controls grasping of an article transported by the transport device having a loop shape.

* * * * *